US011062245B2

(12) United States Patent
Clevenger et al.

(10) Patent No.: US 11,062,245 B2
(45) Date of Patent: Jul. 13, 2021

(54) METHOD, SYSTEM AND APPARATUS FOR SUPPLY CHAIN EVENT REPORTING

(71) Applicant: Zebra Technologies Corporation, Lincolnshire, IL (US)

(72) Inventors: Nathan J. Clevenger, Burnsville, MN (US); Andrew Ehlers, Elmhurst, IL (US); Matthew Louis Kowalski, Merrick, NY (US); John M. Seimer, Glen Cove, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 205 days.

(21) Appl. No.: 16/173,688

(22) Filed: Oct. 29, 2018

(65) Prior Publication Data

US 2020/0134530 A1    Apr. 30, 2020

(51) Int. Cl.
*G06Q 10/06* (2012.01)
*H04L 29/08* (2006.01)
*H04N 7/18* (2006.01)

(52) U.S. Cl.
CPC ....... *G06Q 10/06315* (2013.01); *H04L 67/10* (2013.01); *H04N 7/183* (2013.01)

(58) Field of Classification Search
CPC ............. G06Q 10/06315; G06Q 20/02; G06Q 10/0838; G06Q 30/018; G06Q 10/087;

(Continued)

(56) References Cited

U.S. PATENT DOCUMENTS

| 8,786,871 B2* | 7/2014 | Bledsoe | G06F 3/123 |
| | | | 358/1.13 |
| 2013/0211870 A1* | 8/2013 | Lawson | H04L 12/66 |
| | | | 705/7.25 |

(Continued)

FOREIGN PATENT DOCUMENTS

WO    2017/196655 A1    11/2017

OTHER PUBLICATIONS

International Search Report and Written Opinion for International Application No. PCT/US2019/054636 dated Feb. 14, 2020.

(Continued)

*Primary Examiner* — Mehmet Yesildag
*Assistant Examiner* — Ayanna Minor
(74) *Attorney, Agent, or Firm* — Yuri Astvatsaturov

(57) ABSTRACT

A system for recording events on a distributed ledger includes: a server; a terminal including a terminal processor executing an OS; and a data capture device including a housing, a data capture assembly configured to capture product data, a communication interface, a memory including a first driver and/or a firmware, and a processor executing instructions in the memory. The instructions include instructions to transmit the product data to the terminal through the communication interface. The terminal includes a second driver enabling the OS to communicate with the data capture device to accept the product data. At least one of the first and second drivers and the firmware includes a transmission flag changeable between activated and deactivated states. The activated state causes the product data to be transmitted to the server. Upon the product data satisfying a recordation condition, the product data is recorded, from the server, to the distributed ledger.

18 Claims, 9 Drawing Sheets

(58) Field of Classification Search
CPC ..... H04L 67/10; H04L 9/0637; H04L 5/0098; H04L 67/1097; H04N 7/183; H04N 21/21; H04N 21/658; G06F 16/27; G06F 21/50; G06F 3/123; G06F 16/93; H04W 12/009; G10L 15/34; G05B 19/41855
See application file for complete search history.

(56) References Cited

U.S. PATENT DOCUMENTS

| | | | |
|---|---|---|---|
| 2016/0018817 A1* | 1/2016 | Albers | G05B 19/0426 700/18 |
| 2017/0232300 A1 | 8/2017 | Tran et al. | |
| 2017/0270323 A1* | 9/2017 | Butler | G06K 7/10198 |
| 2018/0075406 A1 | 3/2018 | Kingston et al. | |
| 2018/0094953 A1 | 4/2018 | Colson et al. | |
| 2018/0157583 A1 | 6/2018 | Bache et al. | |
| 2018/0300693 A1 | 10/2018 | Gopinath et al. | |
| 2018/0336515 A1* | 11/2018 | Mehring | H04L 9/0637 |

OTHER PUBLICATIONS

Mohan. Improve Food Supply Chain Traceability using Blockchain. Apr. 2, 2018 (Apr. 2, 2018). [retrieved on Jan. 10, 2020]. Retrieved from the Internet:<URL:https://etda.libraries.psu.edu/files/final_submissions/16822> entire document.

IBM's Blockchain Patents: From-Tracking and Shipping to IoT and Security Solutions, written on Oct. 15, 2018, retrieved from the Internet at <https://cointelegraph.com/news/ibms-blockchain-patents-from-food-tracking-and-shipping-to-iot-and-security-solutions> on Oct. 16, 2020.

* cited by examiner

METHOD, SYSTEM AND APPARATUS FOR SUPPLY CHAIN EVENT REPORTING

BACKGROUND

A given product or service may be produced and distributed by numerous discrete entities, such as subcomponent manufacturers, a manufacturer of the product itself, one or more distributors, a plurality of retail stores, as well as delivery entities. Each of the above-mentioned entities may apply information to the product (or a subcomponent thereof), and/or read information from the product. However, tracing the lifecycle of the product is complicated by the diverse set of computing devices with which such information is applied and/or read, which are generally under the control of different entities and may not be configured to communicate with one another.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
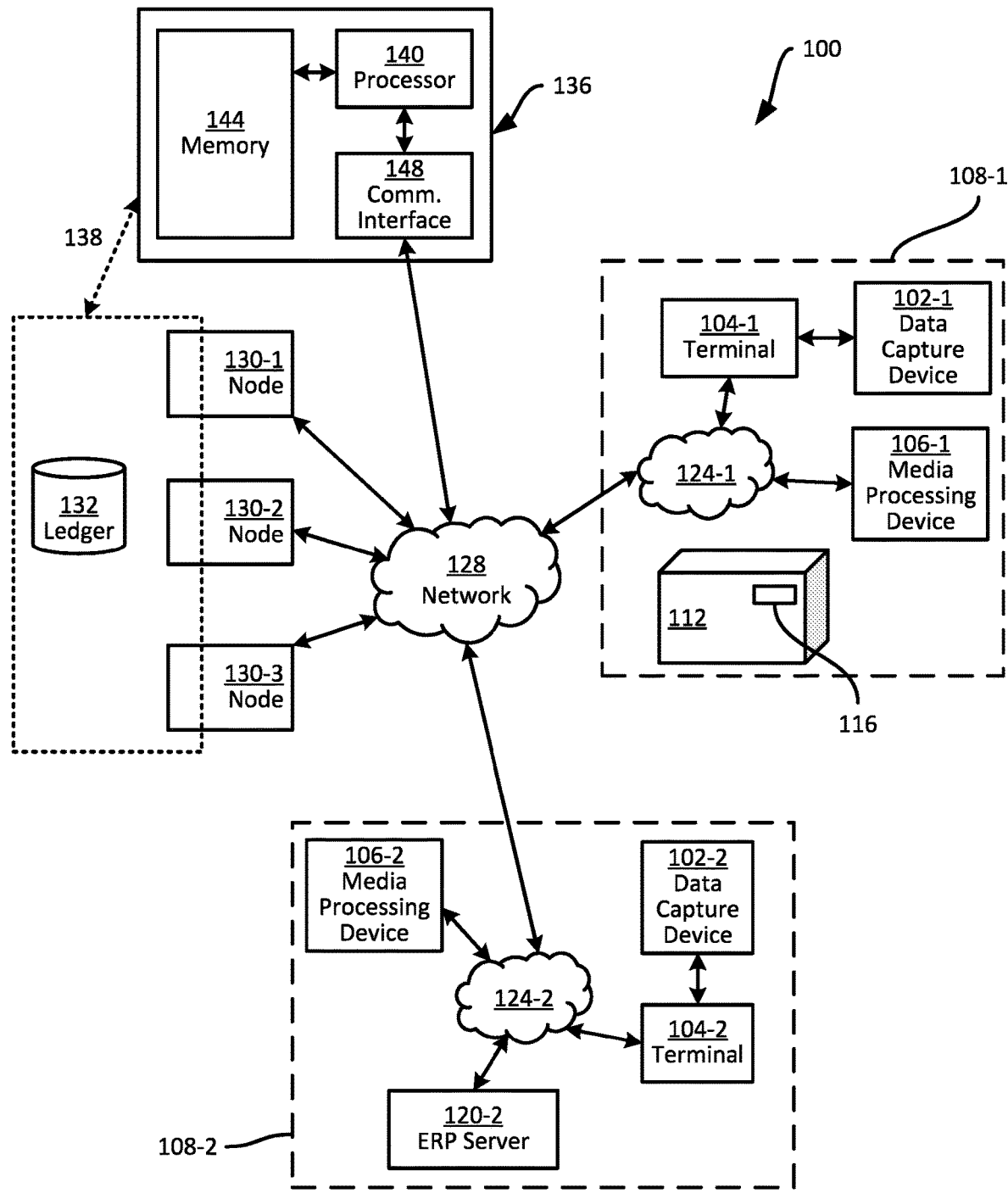
FIG. 1 is a schematic diagram of a system for event reporting.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a system for recording events on a distributed ledger, comprising: a cloud server; a first terminal remote from the cloud server, the first terminal including at least one first terminal processor and an operating system (OS) executing on the at least one first terminal processor; and a data capture device including: a data capture device housing; a data capture assembly positioned at least partially within the data capture device housing, the data capture assembly configured to capture product data associated with products; a data capture device communication interface; a data capture device memory including at least one of a first driver and a data capture device firmware; and at least one data capture device processor configured to execute instructions stored in the data capture device memory. The data capture device is communicatively coupled to the first terminal via the data capture device communication interface, the instructions stored in the data capture device memory of the data capture device include instructions to transmit the product data through the data capture device communication interface, the first terminal further includes a second driver configured to enable the OS to communicate with the data capture device and to accept the product data transmitted through the data capture device communication interface, at least one of (i) the first driver, (ii) the second driver, and (iii) the data capture device firmware includes a transmission flag alternately changeable between an activated state and a deactivated state, the activated state causing at least some of the product data to be transmitted to the cloud server, and upon at least a portion of the at least some of the product data satisfying a predetermined recordation condition, the at least a portion of the at least some of the product data transmitted to the cloud server is caused to be recorded, from the cloud server, to the distributed ledger.

Other examples disclosed herein are directed to a system for recording events on a distributed ledger, comprising: a cloud server; a first terminal remote from the cloud server, the first terminal including at least one first terminal processor and an operating system (OS) executing on the at least one first terminal processor; and a data capture device including: a data capture device housing; a data capture assembly positioned at least partially within the data capture device housing, the data capture assembly configured to capture product data associated with products; a data capture device communication interface; a data capture device memory including at least one of a first driver and a data capture device firmware; and at least one data capture device processor configured to execute instructions stored in the data capture device memory. The data capture device is communicatively coupled to the first terminal via the data capture device communication interface, the instructions stored in the data capture device memory of the data capture device include instructions to transmit the product data through the data capture device communication interface, the first terminal further includes a second driver configured to enable the OS to communicate with the data capture device and to accept the product data transmitted through the data capture device communication interface, at least one of (i) the first driver, (ii) the second driver, and (iii) the data capture device firmware includes a recordation flag alternately changeable between an activated state and a deactivated state, the activated state causing at least some of the product data to be recorded to the distributed ledger.

Additional examples disclosed herein are directed to a system for recording events on a distributed ledger, comprising: a cloud server; a first terminal remote from the cloud server, the first terminal including at least one first terminal processor and an operating system (OS) executing on the at least one first terminal processor; and a data capture device including: a data capture device housing; a data capture assembly positioned at least partially within the data capture device housing, the data capture assembly configured to capture product data associated with products; a data capture device communication interface; a data capture device memory including at least one of a first driver and a data capture device firmware; and at least one data capture device processor configured to execute instructions stored in the data capture device memory. The data capture device is communicatively coupled to the first terminal via the data capture device communication interface, the instructions stored in the data capture device memory of the data capture device include instructions to transmit the product data through the data capture device communication interface, the first terminal further includes a second driver configured to enable the OS to communicate with the data capture device and to accept the product data transmitted through the data capture device communication interface, at least one of (i) the first driver, (ii) the second driver, and (iii) the data capture device firmware includes an eligibility flag alternately changeable between an activated state and a deactivated state, the activated state causing at least some of the product data to be transmitted to the cloud server with an indication of being eligible to be recorded on the ledger, and upon at least a portion of the at least some of the product data satisfying a predetermined recordation condition, the at least a portion of the at least some of the product data transmitted to the cloud server is caused to be recorded, from the cloud server, to the distributed ledger.

Further examples disclosed herein are directed to a data processing device operable to transmit data for recordation on a distributed ledger, comprising: a data processing device housing; a data processing assembly positioned at least partially within the data processing device housing, the data processing assembly configured to at least one of (i) capture product data associated with products and (ii) process media to impart identifying data thereon; a data processing device communication interface; a data processing device memory including at least one of a first driver and a data processing device firmware; and at least one data processing device processor configured to execute instructions stored in the data processing device memory. The data processing device is operable to be communicatively coupled to a terminal via the data processing device communication interface and via a second driver on the terminal, the instructions stored in the data processing device memory of the data processing device include instructions to transmit an acknowledgement of successfully processing data by the data processing assembly, and at least one of (i) the first driver, (ii) the second driver, and (iii) the data processing device firmware includes a recordation flag alternately changeable between an activated state and a deactivated state, the activated state causing acknowledgement data associated with the acknowledgement to be recorded to the distributed ledger.

Still further examples disclosed herein are directed to a data processing device operable to transmit data for recordation on a distributed ledger, comprising: a data processing device housing; a data processing assembly positioned at least partially within the data processing device housing, the data processing assembly configured to at least one of (i) capture product data associated with products and (ii) process media to impart identifying data thereon; a data processing device communication interface; a data processing device memory including at least one of a first driver and a data processing device firmware; and at least one data processing device processor configured to execute instructions stored in the data processing device memory. The data processing device is operable to be communicatively coupled to a terminal via the data processing device communication interface and via a second driver on the terminal, the instructions stored in the data processing device memory of the data processing device include instructions to transmit an acknowledgement of successfully processing data by the data processing assembly, and at least one of (i) the first driver, (ii) the second driver, and (iii) the data processing device firmware includes a recordation flag alternately changeable between an activated state and a deactivated state, the activated state causing acknowledgement data associated with the acknowledgement to be recorded to the distributed ledger.

FIG. 1 depicts a system 100 for supply chain event reporting in accordance with the teachings of this disclosure. The system 100 includes a plurality of data processing devices. As will be apparent in the discussion below, the data processing devices include components configured to perform at least one of reading data from items (e.g. products or the like), and generating data for association with such items (e.g. via physical application to the items).

In the illustrated example, the data processing devices include data capture devices 102-1 and 102-2. The data capture devices 102, as will be described in greater detail below, include any one or more of barcode scanners, wireless tag readers (e.g. radio frequency identification (RFID) readers), and the like. Each data capture device 102 is associated with a corresponding terminal 104-1, 104-2, such as a mobile computer (e.g. a tablet computer, laptop computer, or the like). In other embodiments, the functionality of the data capture devices 102 and the terminals 104 may be integrated in a single physical data processing device. The data processing devices of the system 100 also include media processing devices 106-1 and 106-2. The media processing devices 106 include any one or more of printers (e.g. thermal label printers), wireless tag writers (e.g. RFID tag writers), and the like.

The data processing devices of the system 100 are associated with (e.g. operated by) respective entities 108-1 and 108-2, such as merchant entities participating in a supply chain for goods and/or services. A wide variety of merchant entities 108 are contemplated. In the illustrated example, the entity 108-1 is a supplier (e.g. a manufacturer, a grower of produce, or the like), while the entity 108-2 is a distributor (e.g. responsible for receiving products from the supplier entity 108-1 and transporting or otherwise handling such products for distribution to further entities, such as retailers, consumers and the like). Thus, as illustrated in FIG. 1, the entity 108-1 is shown as having produced or otherwise generated a product 112, for subsequent delivery from a facility operated by the entity 108-1 (e.g. indicated by dashed lines in FIG. 1) to a facility operated by the entity 108-2. The product 112 may initially be marked with product data, illustrated in FIG. 1 in the form of a label 116 bearing a barcode, RFID tag or the like. As will be described in greater detail below, the label 116 is assumed to bear a non-unique product identifier such as a generic universal product code (UPC).

As will be apparent to those skilled in the art, the system 100 can include greater or smaller numbers of the devices 102, 104, 106 than those shown in FIG. 1. Further, the devices 102, 104, 106 can be associated with more merchant entities 108 than shown in FIG. 1, or with fewer merchant entities 108 than shown in FIG. 1. For example, the system 100 may include additional entities such as the above-noted retailers, each operating additional data processing devices (e.g. additional data capture devices 102 and media processing devices 106).

One or more of the entities 108 may operate a local server, such as an enterprise resource planning (ERP) server. An example ERP server 120-2 is shown in association with the entity 108-2. The ERP server 120-2 can maintain and update inventory records and the like, for example responsive to data received at the ERP server 120-2 from any one or more of the data capture device 102-2, the terminal 104-2, and the media processing device 106-2. Other entities 108, such as the entity 108-1 as illustrated in FIG. 1, may omit such a local server. The data capture device 102-1, the terminal 104-1, and/or the media processing device 106-1 may be configured to maintain and update the above-mentioned inventory records. In other examples, however, the entity 108-1 may also include a local server such as an ERP server. The computing devices operated by each entity 108 are connected via one or more local networks 124-1, 124-2, such as any suitable combination of wireless and wired networks. The local networks 124, in turn, are connected to a wide area network 128 (e.g. the Internet), enabling the computing devices at each entity 108 to communicate with computing devices external to the entity 108. In some embodiments, one or more of the local networks 124 can include either or both of local and wide-area networks. In further embodiments, one or more of the local networks 124 can be omitted, and the computing devices at the corresponding entity can connect directly to the network 128.

The production and movement of the product 112 amongst the entities 108 of the system 100 can lead to the generation of data defining various events, such as scan events following receipt of the product at certain locations, media processing events following the application of information to the product 112 prior to transport to another entity, and the like. Such data may be exchanged amongst the entities 108, as well as with other entities such as retailers, regulatory authorities, financial institutions and the like. The system 100, in other words, may include a plurality of other computing devices (e.g. servers, client devices, or the like) referred to generally as nodes 130, of which examples 130-1, 130-2 and 130-3 are illustrated in FIG. 1.

As used herein, references to a distributed ledger 132 may be understood as references to a distributed ledger implemented via blockchain technology. For example, data stored and/or processed by and/or on nodes 130 may be achieved via the implementation of a, for example blockchain, distributed ledger 132 (also referred to as distributed ledger technology, or DLT, 132). For example, a copy of the DLT 132 may be maintained at each of the nodes 130, as indicated by the dashed box surrounding the DLT 132 in FIG. 1. As will be apparent to those skilled in the art, nodes participating in the maintenance of the DLT 132 (e.g. including the nodes 130) may generate transactions for storage on the DLT 132 and synchronize such transactions with the other participating nodes.

The system 100 also includes a cloud server 136, also referred to as a multi-merchant or multi-entity server 136. The cloud server 136 is remote from the computing devices of the entities 108 and can be configured as a node participating in the maintenance of the ledger 132. Thus, the server 136 is connected to the ledger 132 via a link 138, which may be implemented in a variety of ways. In some examples, the link 138 is implemented as a result of the server 136 itself being a node on the DLT 132. That is, the link 138 is implemented by virtue of a copy of the DLT 132 being stored, e.g. in the memory 144. In other examples, the server 136 is connected to a node 130 via the network 128. The server 136 itself, in such examples, does not directly record data to the ledger 132, but instead transmits data to the above-mentioned node 130 for recordal. In such examples, the link 138 is implemented via the connection between the server 136 and the node 130.

The cloud server 136 is further configured to generate transactions for application to the ledger 132 based at least in part on event data received from the entities 108. In particular, the data capture devices 102 and/or terminals 104, as well as the media processing devices 106, are configured to generate and transmit event reporting data (which may also be referred to herein as acknowledgement data) under certain conditions. Such event reporting data may cause the server 136 to record one or more transactions to the ledger 132, e.g. to track the movements and lifecycle of the product 112. The system 100, in other words, enables the direct reporting of event data from the data processing devices operated by the entities 108 to the server 136 for application to the ledger 132, reducing or eliminating the need to reconfigure the computing devices operated by each entity 108 (e.g. the data capture devices 102, terminals 104, media processing devices 106 and servers 120) to enable the recording of event data to the ledger 132.

The cloud server 136 includes a processor 140 connected to a memory 144 (which, as noted above, may store a copy of the ledger 132 to be synchronized with the nodes 130 responsive to the recordal of data to the ledger 132 by any of the server 136 and the nodes 130). The processor 140 and the memory 144 each include one or more integrated circuits (ICs). Although the cloud server 136 is illustrated as a discrete computing device, containing the above-mentioned components in a single physical enclosure, in other embodiments, the cloud server 136 is implemented as a distributed computing device in which the above-mentioned components are implemented on a plurality of underlying hardware devices (e.g. a plurality of processors 140 and associated memories 144). The cloud server 136 is connected to the network 128 via a communication interface 148, which includes any suitable combination of hardware elements (e.g. network interface controllers and the like) and corresponding firmware and/or software for controlling such components.

Figure 2A:
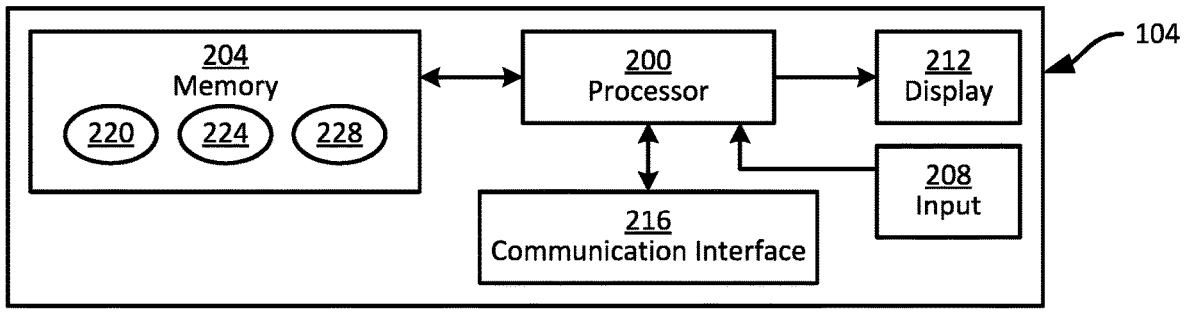
FIGS. 2A-2C are block diagrams of certain internal hardware components of the terminal, the data capture device, and the media processing device of FIG. 1, respectively.
Figure 2B:
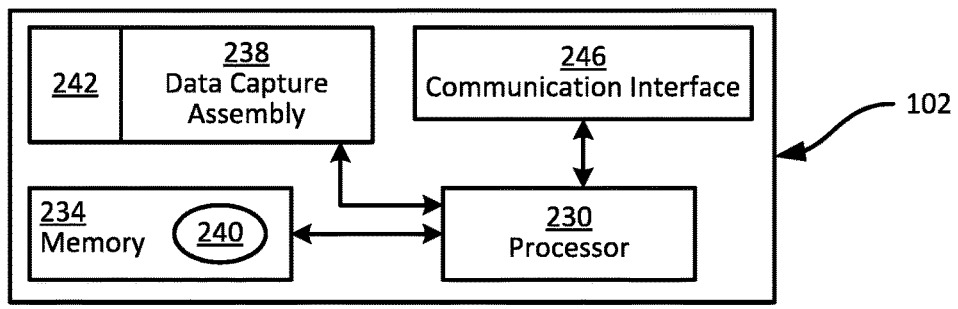
Figure 2C:
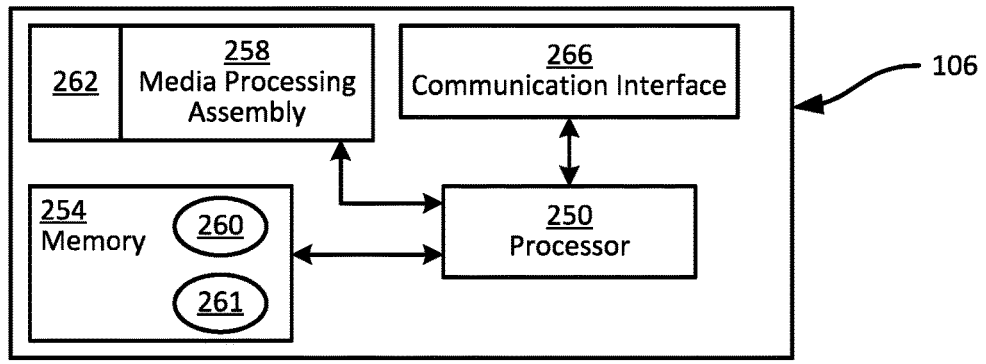

Turning now to FIGS. 2A-2C, certain components of each of a terminal 104, a data capture device 102 and a media processing device 106 are illustrated in greater detail. The components shown in FIGS. 2A-2C are generic to the devices 102, 104, 106 as shown in FIG. 1, although it will be understood that the devices 102, 104, 106 need not have identical configurations.

Referring to FIG. 2A, the terminal 104 includes a central processing unit (CPU), also referred to as a processor 200, interconnected with a non-transitory computer readable storage medium, such as a memory 204. The memory 204 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 200 and the memory 204 each comprise one or more integrated circuits.

The terminal 104 also includes at least one input assembly 208 interconnected with the processor 200. As will be apparent to those skilled in the art, the input assembly 208 is configured to receive input and provide data representative of the received input to the processor 200. The input assembly 208 can therefore include any one of, or any suitable combination of, a keypad, a touch screen, a trigger module, and the like. Other examples of input assemblies include a keyboard, a mouse, a microphone, and the like.

The terminal 104 also includes a display 212, such as a flat-panel display (e.g. an organic light-emitted diode (OLED) based display). In other examples, however, the display 212 can be implemented with any of a wide variety of display technologies. The terminal 104 can include additional output assemblies beyond the display 212 in other examples, including any one or more of a speaker, a notification LED, and the like.

The terminal 104 also includes a communications interface 216 interconnected with the processor 200. The communication interface 216 includes any suitable hardware (e.g. transmitters, receivers, network interface controllers and the like) allowing the terminal 104 to communicate with other computing devices via a link with a network (e.g. the corresponding network 124) and/or via a local link (e.g. Bluetooth or the like). The specific components of the communication interface 216 are selected based on the type of network or other links that the terminal 104 is required to communicate over.

The memory 204 stores a plurality of instructions for execution by the processor 200 to implement various functionality at the terminal 104. The instructions stored in the memory 204 can include, for example, an operating system (OS) 220, as well as a driver 224 enabling the terminal 104 to receive event data from the data capture device 102 (e.g. via the communication interface 216). The driver 224, as will be discussed below, may also be incorporated into the operating system 220. The memory 204 can also store a product data processing application 228. The application 228 can be, for example, an ERP application for execution in cooperation with an ERP application executed on a local server 120 to process event data received from the data capture device 102. In other examples, the application 228 implements ERP or other event processing functionality independent of the local server 120.

Turning to FIG. 2B, the data capture device 102 includes a central processing unit (CPU), also referred to as a processor 230, interconnected with a non-transitory computer readable storage medium, such as a memory 234. The data capture device 102 also includes a data processing assembly, in the form of a data capture assembly 238 positioned at least partially within a housing of the data capture device 102. The data capture assembly 238 includes any one or more of a barcode reader (e.g. having one or more image sensors, laser scan modules or the like), wireless tag reader (e.g. an RFID reader) and the like. The data capture assembly 238 can also include an input device such as a trigger, button or the like for initiating a data capture operation. In general, the data capture assembly 238 is configured to capture data associated with the product 112 (and other products), such as data printed, embedded or otherwise presented on the label 116 shown in FIG. 1. The captured data is decoded for further processing.

Control of the data capture assembly 238 to capture and decode data from the product 112 is implemented via the execution of at least one of a driver 240 maintained in the memory 234, and a firmware. In the present example, the data capture assembly 238 includes an auxiliary memory 242 storing the above-mentioned firmware for execution by the processor 230 or by a dedicated microcontroller of the data capture assembly 238. For ease of reference, the auxiliary memory 242 will also be referred to herein as the firmware 242. More generally, the data capture device 102 stores instructions for controlling the data capture assembly 238 to capture and decode data (e.g. from the product 112), and to transmit the decoded data (also referred to as product data) to the terminal 104. Transmission of the product data to the terminal 104 is effected by the data capture device 102 via a communication interface 246, such as a local communication interface (e.g. Bluetooth, universal serial bus (USB) or the like).

As will be described in greater detail herein, at least one of the firmware 242, the driver 240 and the driver 224 (of the terminal 104) include a flag having one of an activated state and a deactivated state. When the flag is in the activated state, certain event data is caused to be transmitted to the server 136 and/or recorded to the ledger 132.

Turning to FIG. 2C, the media processing device 106 includes a central processing unit (CPU), also referred to as a processor 250, interconnected with a non-transitory computer readable storage medium, such as a memory 254. The media processing device 106 also includes a data processing assembly, in the form of a media processing assembly 258 positioned at least partially within a housing of the media processing device 106. The media processing assembly 258 includes any one or more of a printer (e.g. a thermal label printer having one or more printheads, supplies of media for application to products, and the like), wireless tag writer (e.g. an RFID writer) and the like. In general, the media processing assembly 258 is configured to receive media processing data specifying, for example, one or more product identifiers to be applied to media (e.g. a label, RFID tag or the like). The media processing assembly 258 is further configured, responsive to receipt of the media processing data, to process media (e.g. to generate a label, write data to an RFID tag or the like). The processed media may be applied to the product 112, either before or after processing according to the media processing data by the media processing assembly 258.

Control of the media processing assembly 258 to receive media processing data and process one or more units of media accordingly is implemented via the execution of at least one of a driver 260 maintained in the memory 254, and a firmware. The memory 254 can also store an operating system 261 for execution by the processor 250 in some embodiments. In such embodiments, the driver 260 may be incorporated into the operating system 261.

In the present example, the media processing assembly 258 includes an auxiliary memory 262 storing the above-mentioned firmware for execution by the processor 250 or by a dedicated microcontroller of the media processing assembly 258. For ease of reference, the auxiliary memory 262 will also be referred to herein as the firmware 262. More generally, the media processing device 106 stores instructions for controlling the media processing assembly 258 to receive media processing data, process one or more items of media (e.g. for application to the product 112), and to transmit event completion data indicating completion of the media processing to the server 136. Transmission of the event completion data to the server 136 is effected by the media processing device 106 via a communication interface 266, including any suitable hardware and firmware components to enable the media processing device 106 to communicate via the networks 124 and 128.

As will be described in greater detail herein, at least one of the firmware 262 and the driver 260 include a flag having one of an activated state and a deactivated state. When the flag is in the activated state, as noted above in connection with the flag associated with the terminal 104 and the data capture device 102, certain event completion data is caused to be transmitted to the server 136 and/or recorded to the ledger 132.

Figure 3:
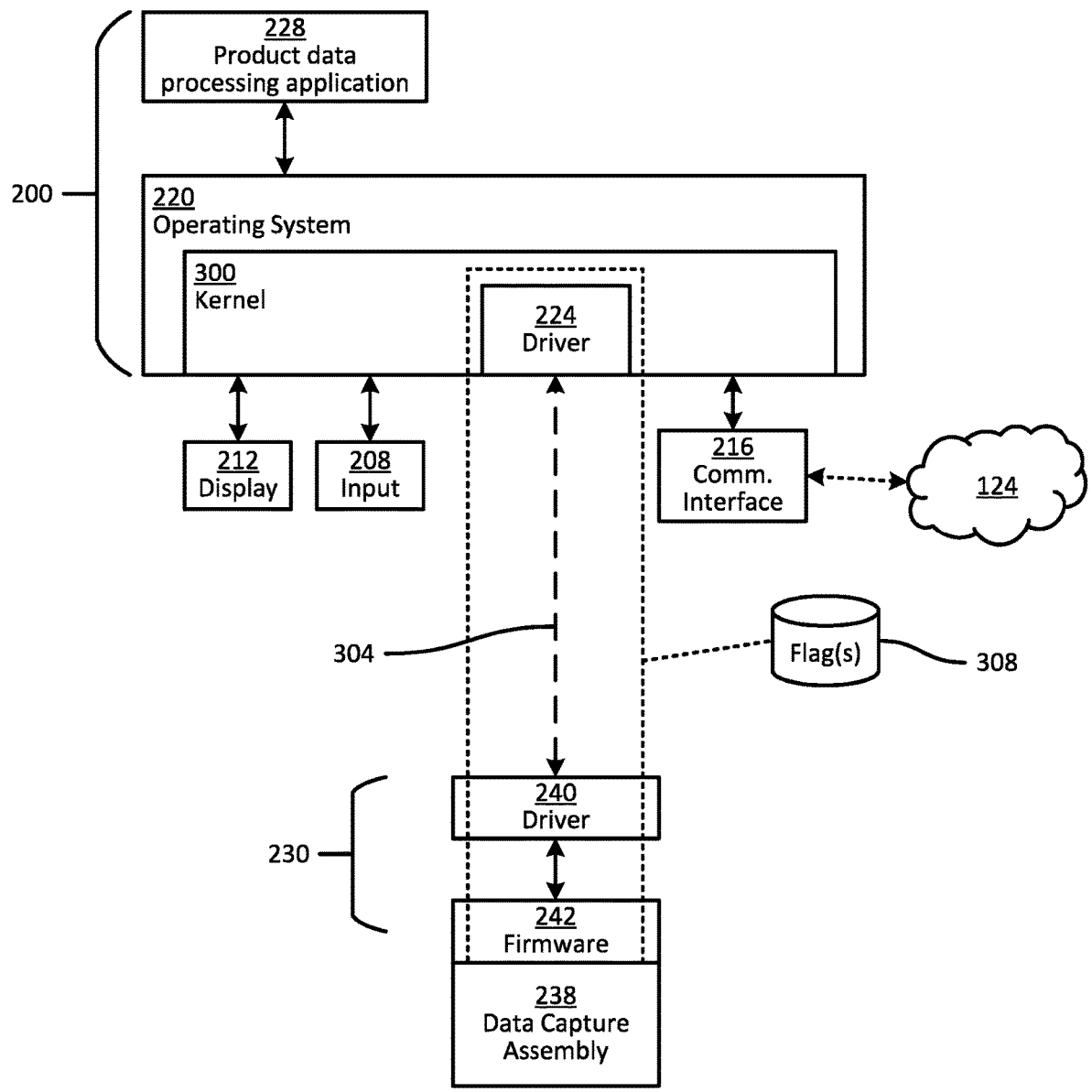
FIG. 3 is a block diagram of certain internal components of the terminal and the data capture device of FIGS. 2A and 2B.
Figure 4:
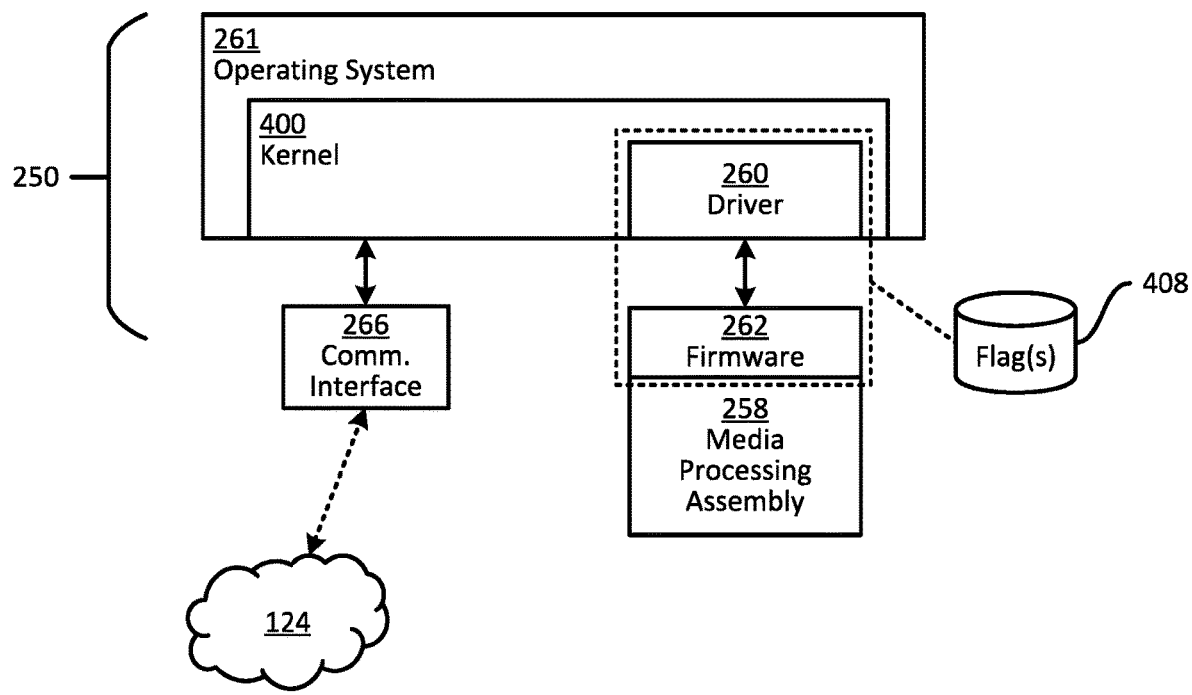
FIG. 4 is a block diagram of certain internal components of the media processing device of FIG. 2C.

Turning to FIGS. 3 and 4, the implementation of the above-mentioned flags and the associated handling of event data by the data capture device 102 and the terminal 104, as well as the media processing device 106, will be discussed in greater detail. Referring first to FIG. 3, certain components of the terminal 104 are shown as being executed by the processor 200, while certain components of the data capture device 102 are shown as being executed by the processor 230.

The operating system 220 is shown as including a kernel 300, containing device drivers and the like to permit the control of the hardware elements of the terminal 104, including the input 208, the display 212 and the communication interface 216. In particular, the kernel 300 is shown as including the driver 224 mentioned above, the execution of which by the processor 200 enables the terminal 104 to receive product data captured by the data capture device 102. The product data may also be referred to as acknowledgement data, and may be provided to the terminal 104 by the data capture device 102 in response to an input (either from the terminal 104 or from an input mechanism of the data capture device 102 itself) causing the data capture assembly 238 to initiate a data capture operation.

Specifically, the product data is received via the communication interface 216 and processed by the driver 224, e.g. in combination with a driver for operating the communication interface 216 itself. The product data is generated by the data capture assembly 238 under the control of the driver 240 and/or the firmware 242 (as executed by the processor 230). Although the transmission of data from the data capture device 102 to the terminal 104 is illustrated schematically as a link 304 extending between the driver 240 and the driver 224, it will be understood that the link 304 also traverses the communication interface 246 of the data capture device 102 and the communication interface 216 of the terminal 104.

Also illustrated in FIG. 3 is a repository 308 containing the above-mentioned flag. The repository 308, as indicated by the dashed box surrounding the driver 224, the driver 240 and the firmware 242, can be contained in any one of the above-mentioned three components within the dashed box. That is, the repository 308 is not contained in the application 228, and configuration of the repository 308 is not under the control of the application 228 (or a corresponding ERP application on a local server 120, for example). The placement of the repository 308 below the application layer (i.e. separated from the computing environment in which end-user applications such as the application 228 are executed) as illustrated and discussed above may mitigate the need to modify the application 228 to enable the recordation functionality described herein, and may also render the repository 308 less susceptible to manipulation by operators of the devices 102 and 104, e.g. via the application 228.

Data received at the driver 224 of the terminal 104 can be directed along either or both of two data paths, based in part on the contents of the repository 308. A first data path connects the data capture assembly 238, via the firmware 242 and/or driver 240 and the driver 224, with the application 228. For example, the driver 224 can be configured to pass the product data received from the data capture device 102 to the operating system 220, for provision to the application 228 and subsequent processing (e.g. to present the product data on the display 212, forward the product data to a local server 120, or the like). A second data path connects the data capture assembly 238, via the firmware 242 and/or driver 240 and the driver 224, with the server 136 via the communication interface 216 and the networks 124 and 128. That is, the driver 224 can be configured to transmit the product data to the cloud server 136 via the communication interface 216 independently of any transmission of the product data via the above-mentioned first data path.

Whether the second data path is employed for captured product data received at the driver 224 is determined by the contents of the repository 308. The repository 308 contains at least one flag indicating whether data captured by the data capture device 102 is to be sent to the server 136 and/or recorded to the ledger 132. Table 1, below, illustrates an example repository 308 stored within one or more of the driver 224, the driver 240 and the firmware 242.

TABLE 1

| Flag Repository 308 | |
| --- | --- |
| Product Data Type | Flag State |
| UPC decode | Active |
| QR decode | Inactive |

As seen above, the repository 308 can include more than one flag, for example with each flag corresponding to a different type of product data. Thus, as shown in Table 1, the repository 308 contains a first flag corresponding to decoded UPC barcodes captured by the data capture device 102, and a second flag corresponding to decoded QR codes captured by the data capture device 102. In other embodiments, the repository 308 can contain additional flags corresponding to further types of product data. In further embodiments, the repository 308 can contain only a single flag, which is applied to all captured product data (regardless of symbology or other attributes).

Each flag in the repository 308 is alternately changeable between an active state and an inactive, or deactivated, state. However, as the repository 308 is stored in one or more of the drivers 224 and 240 and the firmware 242, the application 228 (and any other applications executing on the terminal 104) does not control the activation state of the flag(s) in the repository.

As will be discussed in greater detail below, the state of a flag in the repository 308 determines whether product data captured by the data capture assembly 238 is transmitted to the cloud server 136, and may also determine whether the product data is recorded to the ledger 132 (e.g. by the cloud server 136). For example, the flags in the repository 308 can be transmission flags. An active transmission flag indicates that product data is to be transmitted to the server 136 for further processing. In such embodiments, a further evaluation is performed (e.g. at the server 136), according to one or more recordation conditions, to determine whether to record the transmitted product data to the ledger 132. A deactivated transmission flag indicates that the product data is not to be transmitted to the server 136 (and therefore is also not to be recorded to the ledger 132).

In other examples, the flags in the repository 308 can be recordation flags. An active recordation flag indicates that product data is to be transmitted to the server 136 and also recorded to the ledger 132 (e.g. by the server 136 upon receipt of the product data). When the flags are implemented as recordation flags, product data sent to the server 136 can be sent along with an instruction causing the server 136 to record the product data to the ledger 132. A deactivated recordation flag indicates that the product data is not to be recorded to the ledger 132, or transmitted to the server 136.

In further examples, the flags in the repository 308 can be eligibility flags. An active eligibility flag indicates that product data is to be transmitted to the server 136 along with an instruction to determine, at the server 136, whether to record the product data to the ledger 132. A deactivated eligibility flag indicates that the product data is to be transmitted to the server 136, without the above-mentioned instruction. Thus, in the case of a deactivated eligibility flag, the product data is transmitted to the server 136 and may be processed thereon, but the server 136 is not caused to make a determination of whether to record the product data to the ledger 132.

Referring now to FIG. 4, certain components of the media processing device 106 are shown as being executed by the processor 250. The operating system 261 is shown as including a kernel 400, containing device drivers and the like to permit the control of the hardware elements of the media processing device 106, including the media processing assembly 258 and the communication interface 266. In particular, the kernel 400 is shown as including the driver 260 mentioned above. The execution of the driver 260 and/or the firmware 262 enables the media processing device 106 (in particular, the OS 261, in the present example) to transmit media processing data to the media processing assembly 258 for the generation of labels, wireless tag payload data, and the like, as well as to receive event completion (also referred to as acknowledgement data) from the media processing assembly indicating the successful processing of media (e.g. the printing of a label, writing of payload data to an RFID tag, or the like).

Responsive to sending media processing data to the media processing assembly 258 and receiving event completion data from the media processing assembly 258 indicating the completion of a media processing event (e.g. the printing of a label), the media processing device 106 can be configured to transmit the event completion data to the server 136, where the event completion data may be recorded to the ledger 132. Whether the event completion data is transmitted to the server 136 and/or recorded to the ledger 132 is determined by one of more flags stored in a repository 408. The repository 408 containing the above-mentioned flags, as indicated by the dashed box surrounding the driver 260 and the firmware 262, can be contained in either or both of the above-mentioned two components within the dashed box. As noted above in connection with the repository 308, the deployment of the repository 408 below the application layer at the media processing device 106 may render the repository 408 less susceptible to manipulation. Table 2, below, illustrates the contents of an example repository 408.

TABLE 2

Flag Repository 408

| Event Completion Data Type | Flag State |
|---|---|
| Serialized GS1 print | Active |
| UPC print | Inactive |

As seen above, and as discussed earlier in connection with the repository 308 associated with the data capture assembly 238, the repository 408 can contain more than one flag, for example corresponding to different types of event completion data (e.g. separate flags may be stored in the repository 408 for different types of data printed onto labels, as shown in Table 2). As also discussed above, the flags in the repository 408 can be processed as transmission, recordation, or eligibility flags.

The operation of the system 100 will now be described in greater detail, with reference to the flowcharts of FIGS. 5, 6 and 7 and the components discussed above in connection with FIGS. 2A-2C, 3 and 4. In the example operation of the system 100 discussed below, the flags in the repositories 308 and 408 are assumed to be transmission flags, determining whether or not event data (e.g. product data captured by the data capture device 102, or event completion data generated by the media processing device 106) is transmitted to the server 136 for potential recordation to the ledger 132.

Figure 5:
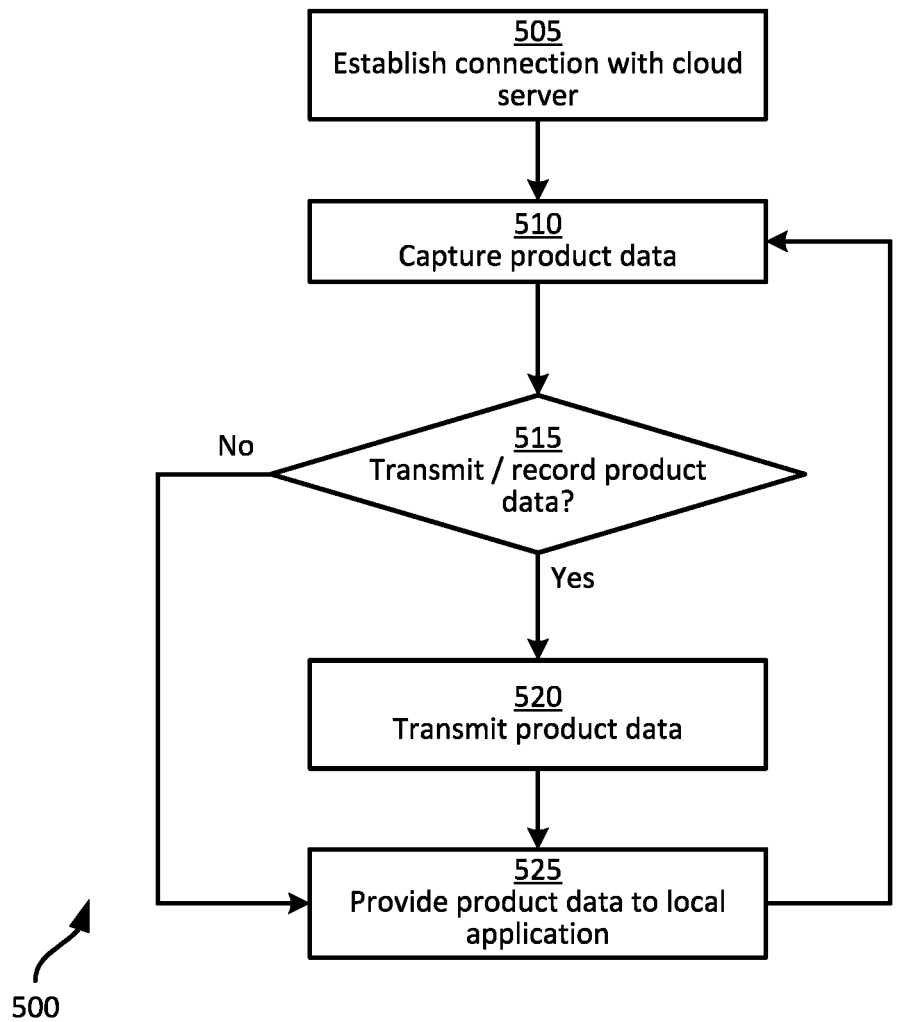
FIG. 5 is a flowchart of an event reporting method at a data capture device and terminal of FIG. 1.

Referring first to FIG. 5, a method 500 of event recordation is depicted, as performed by the data capture device 102 and the terminal 104. The present example performance of the method 500 is performed by the data capture device 102-1 and the terminal 104-1, associated with the entity 108-1 where the product 112 is manufactured or otherwise generated (e.g. packaged from materials received from another entity 108).

At block 505, the terminal 104-1 is configured to establish a connection with the cloud server 136. In particular, one or more components of the OS 220 (e.g. the driver 224) can be configured to retrieve a preconfigured network identifier (e.g. an IP address or URL stored in the memory 204) corresponding to the server 136 and to transmit a request to the server 136 via the communications interface 216. At block 510, the data capture device 102-1 is configured to capture product data. In particular, in the present the data capture assembly 238 is configured to capture and decode the previously mentioned UPC barcode appearing on the label 116. In other examples, the performance of block 510 includes reading payload data from an RFID or other wireless tag, decoding any other suitable barcode symbology, or a combination thereof. The product data captured at block 510 can also include associated metadata, such as a timestamp indicating the date and time at which block 510 was performed, location data (e.g. from a GPS receiver of the terminal 104-1) indicating the location of the terminal 104-1 when block 510 was performed, or the like. Various other forms of metadata are also contemplated, including an expected product shipping (i.e. dispatch) time, an actual product shipping time, expected and actual product delivery times, and the like. As will now be apparent, the product data captured by the data capture assembly 238 of the data capture device 102-1 is transmitted to the terminal 104-1 via the link 304 mentioned earlier.

At block 515, the terminal 104-1 is configured to determine whether to transmit the product data to the cloud server 136. The determination at block 515 is made on the basis of the flag(s) in the repository 308. Thus, the terminal 104-1 (e.g. the driver 224) is configured to retrieve the flag corresponding to the type of the product data from the repository 308. In the present example, as shown in Table 1, the flag for UPC barcode data is in the activated state, and the determination at block 515 is therefore affirmative. Because the flag is a transmission flag in the present example, the determination at block 515 relates only to whether to transmit the product data to the server 136. As will be discussed below, the determination of whether to record any portion of the product data to the ledger 132 will be made at the server 136 itself (although in other embodiments, it is contemplated that such a determination may also be made at block 515).

When the determination at block 515 is affirmative, as in the present example, at block 520 the terminal 104-2 (e.g. the driver 224) is configured to transmit at least a portion of the product data to the cloud server 136 via the connection established at block 505. Following the performance of block 520, the driver 224 (and other suitable components of the OS 220) is configured to provide the product data to the application 228 at block 525. In other words, following an affirmative determination at block 515, the product data is transmitted along both of the previously mentioned data paths, and the transmission of the product data to the server 136 is independent of any transmission of the product data to the application 228 (or other user-level applications residing on the terminal 104-1). When the determination at block 515 is negative, the performance of the method 500 proceeds directly to block 525.

Thus, in the above example performance of the method 500, the data capture device 102-1 and the terminal 104-1 are configured to capture and decode a UPC string from the label 116, and to transmit the UPC string to the server 136, e.g. along with corresponding metadata such as a timestamp and a location.

Figure 6:
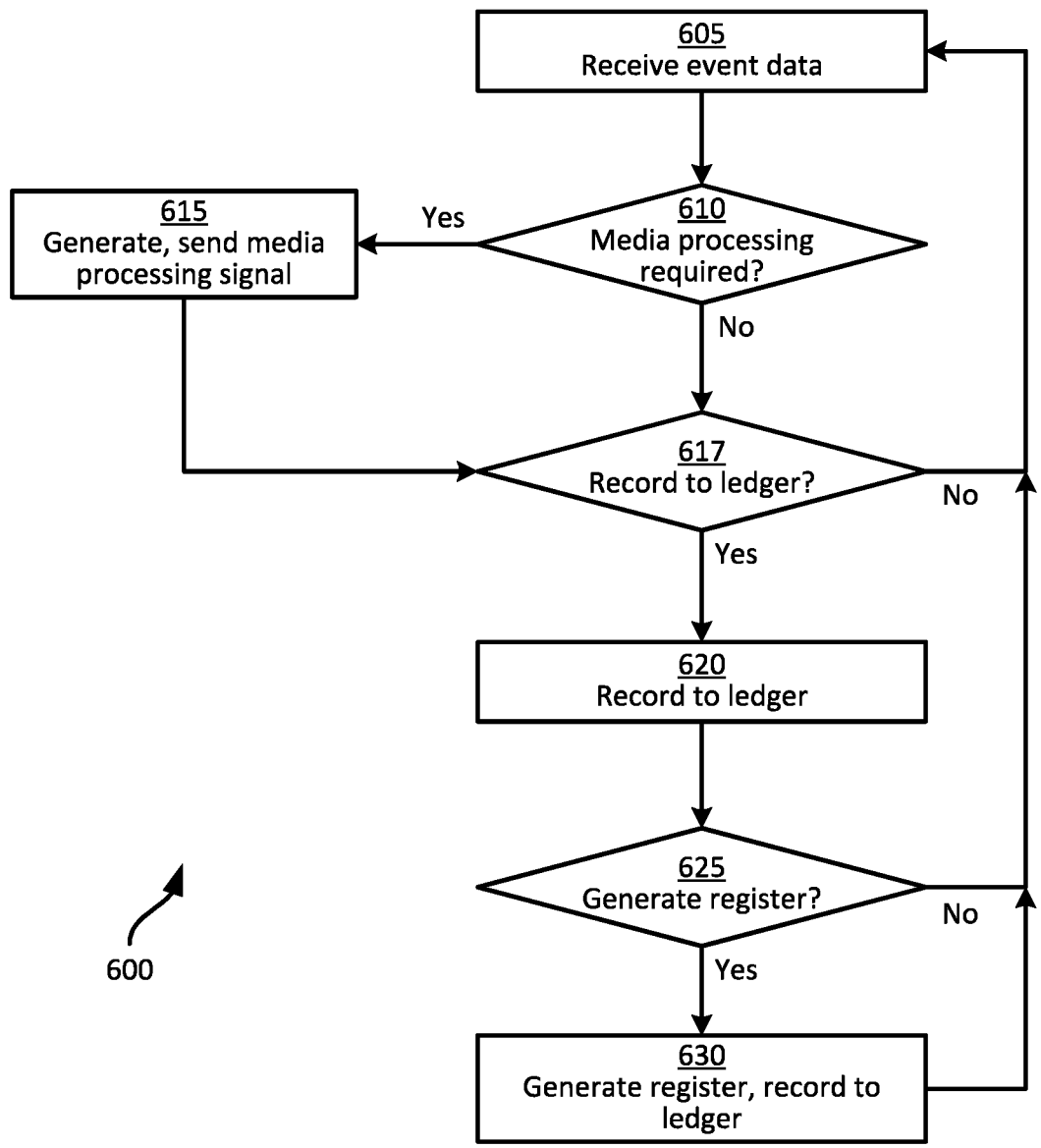
FIG. 6 is a flowchart of an event reporting method at the cloud server of FIG. 1.

Referring now to FIG. 6, a method 600 of event recordation at the server 136 is illustrated. At block 605, the server 136 is configured to receive event data. In the present example performance of the method 600, the server 136 is configured to receive the UPC string transmitted by the terminal 104-1 via the performance of block 520 described above. As will be understood by those skilled in the art, the event data received at block 605 can include product data from a terminal 104 (having been captured by a data capture device 102) as well as event completion data from a media processing device 106.

At block 610, the server 136 is configured to determine whether to generate media processing data corresponding to the event data received at block 605. The determination at block 610 can include, for example, determining whether the event data received at block 605 includes a non-unique product identifier. In the present example, in which the event data received at block 605 is a UPC string (i.e. a non-unique product identifier), the determination at block 610 is affirmative. At block 615, the server 136 therefore generates and sends a media processing signal to a media processing device 106. In particular, the server 136 is configured to generate a unique product identifier such as a serialized barcode to uniquely distinguish the product 112 from other products 112 (including those bearing the same UPC). The server 136 is configured to send the serialized barcode or other unique identifier, along with other media processing data such as a label format, to the media processing device 106-1. The server 136 can also be configured to record any or all of the media processing data generated at block 615 to the ledger 132. In the present example, as will be discussed below, recordal of the serialized barcode awaits the receipt of confirmation from a media processing device 106 that a label bearing the serialized barcode has been printed. In some embodiments, however, a transaction containing the serialized barcode may be recorded to the ledger at block 615, and a further transaction may be recorded upon receipt of the above-mentioned confirmation.

Following the performance of block 615, the server 136 proceeds to block 617, to determine whether to record the event data received at block 605 to the ledger 132. The determination at block 617 can be based on an indicator received with the event data at block 605 (e.g. an recordation indicator or an eligibility indicator when the flags in the repository 308 are recordation or eligibility flags). The determination at block 617 can also include a determination of whether the event data from block 605 uniquely identifies the product 112. When the event data does not uniquely identifies the product 112, the event data may not be suitable for recordation on the ledger 132. In the present example, therefore, the determination at block 617 is negative, and the server 136 returns to block 605 to await further event data. That is, the remainder of the method 600 is not performed in the present performance of the method 600.

Figure 7:
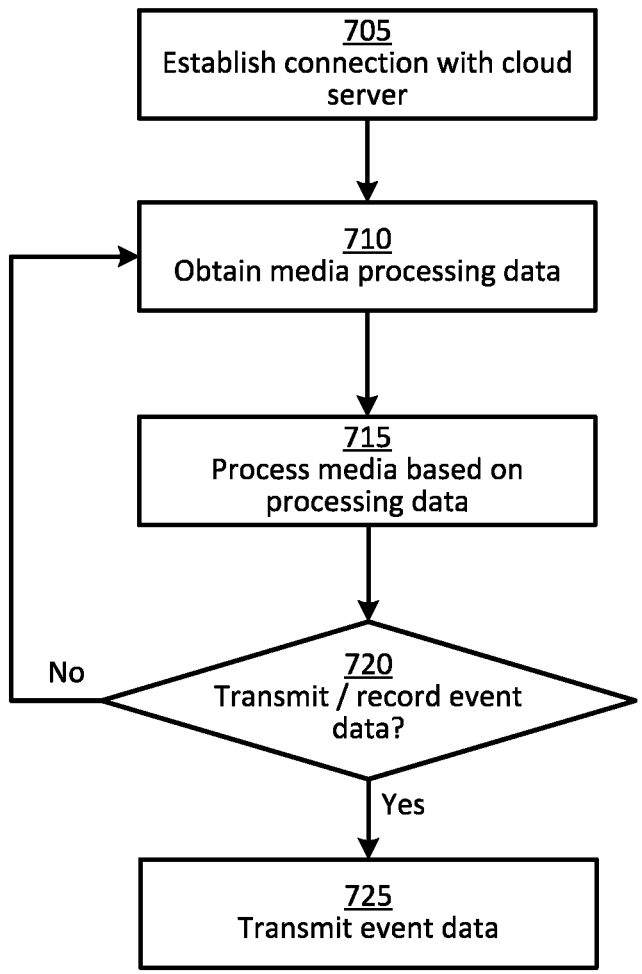
FIG. 7 is a flowchart of an event reporting method at a media processing device of FIG. 1.

Turning to FIG. 7, a method 700 of event recordation at the media processing device 106 is illustrated. In particular, the method 700 will be described in conjunction with its performance by the media processing device 106-1. At block 705, the media processing device 106-1 is configured to establish a connection with the cloud server 136. In particular, one or more components of the OS 261 (e.g. the driver 260) can be configured to retrieve a preconfigured network identifier (e.g. an IP address or URL stored in the memory 254) corresponding to the server 136 and to transmit a request to the server 136 via the communications interface 266.

At block 710 the media processing device 106-1 is configured to obtain media processing data. The media processing data can be obtained locally, e.g. from an input assembly of the media processing device 106-1. In further examples, the media processing data can be obtained from a local server 120. In the present example, the media processing data is obtained via receipt (e.g. over the connection established at block 705) of the media processing signal described above. The media processing data therefore includes the above-mentioned serialized barcode, with or without additional data such as a label format, wireless tag writing parameters or the like. In general, the media processing data includes sufficient data for the media processing device 106-1 to process one or more units of media via control of the media processing assembly 258 (e.g. to generate one or more labels, write payload data to one or more RFID tags or the like).

Figure 8:
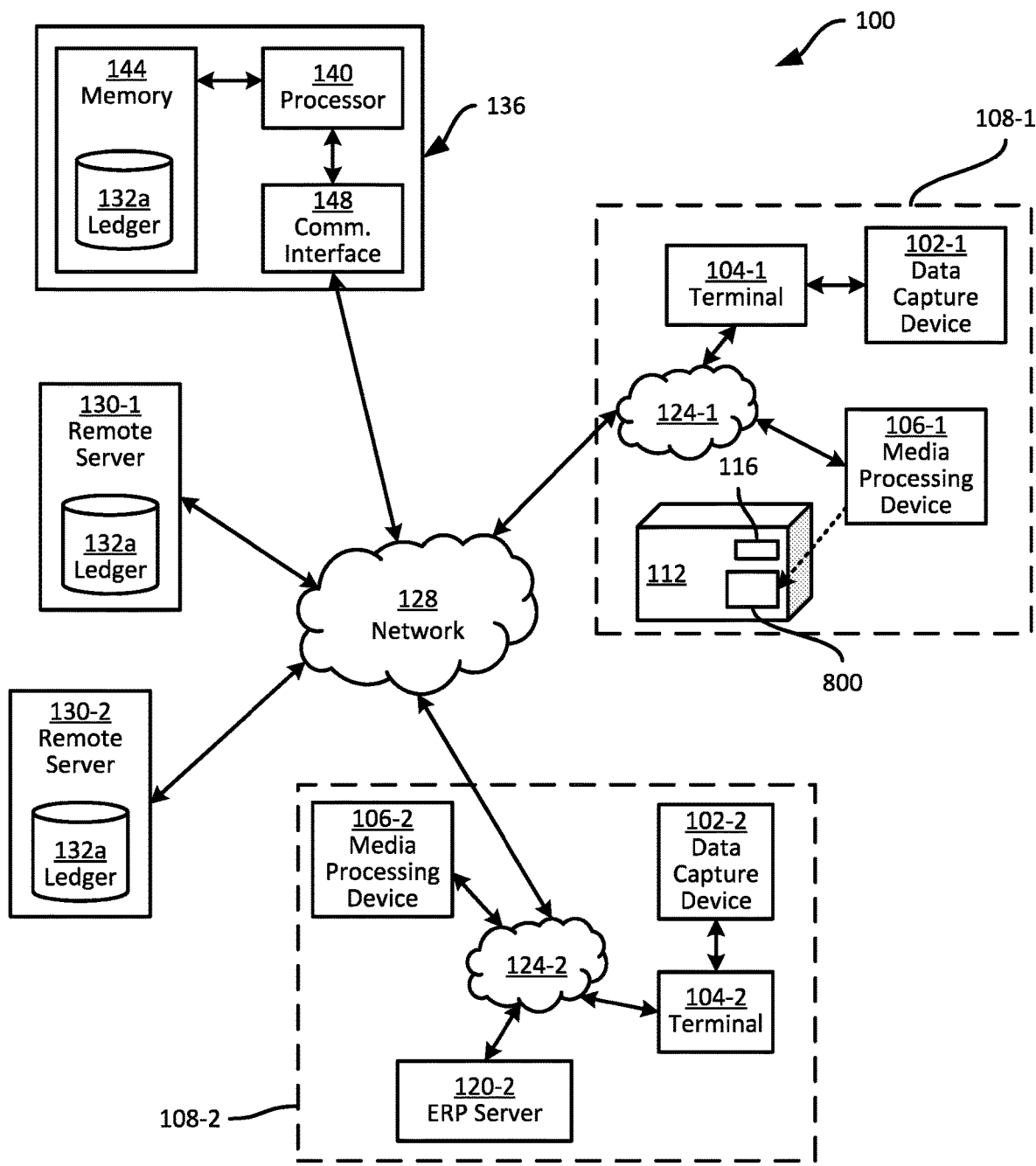
FIG. 8 is a diagram illustrating the system of FIG. 1 following performances of the methods of FIGS. 5-7.

At block 715, the media processing device 106-1 is configured to process one or more units of media according to the media processing data. In the present example, therefore, referring to FIG. 8, the media processing device 106-1 is configured to generate a label 800 for application to the product 112. The label 800 includes a symbol such as the above-mentioned serialized barcode (which, as noted above, uniquely identifies the product 112). Returning to FIG. 7, at block 720, following successful completion of the media processing at block 715, at block 720 the media processing device 106-1 is configured to determine whether to transmit the event completion data to the cloud server 136. The event completion data indicates the successful processing of media at block 715, and may include the data printed to a label, written to a wireless tag, or the like.

The determination at block 720 is made on the basis of the flag(s) in the repository 408. Thus, the media processing device 106-1 (e.g. the driver 260) is configured to retrieve the flag corresponding to the type of the event completion data from the repository 408. In the present example, as shown in Table 2, the flag corresponding to the printing of a label bearing a serialized barcode is in the activated state, and the determination at block 720 is therefore affirmative. Because the flag is a transmission flag in the present example, the determination at block 720 relates only to whether to transmit the event completion data to the server 136. In other examples, depending on the nature of the flags in the repository 408, the determination at block 720 can also include determining whether the event completion data is to be recorded to the ledger 132. In the present example, such a determination is left to the server 136. At block 725, following an affirmative determination at block 720 the media processing device 106-1 is configured to transmit the event completion data to the server 136. As noted above in connection with FIG. 5, the event completion data transmitted at block 725 can include metadata such as a timestamp and/or location of the media processing device 106-1 at the time block 715 was performed. Following the performance of block 725, the media processing device 106-1 may return to block 710 to await further media processing data.

Returning to FIG. 6, a further performance of the method 600 by the server 136 will be described, responsive to receiving the event completion data sent by the media processing device 106-1. In particular, at block 605 the server 136 is configured to receive the event completion data, indicating the successful generation of the label 800, from the media processing device 106-1. The determination at block 610 is negative (e.g. because the event completion data contains a unique product identifier). Further, at block 617 the server 136 is configured to determine that the event completion data is to be recorded to the ledger 132. At block 620, therefore, the server 136 is configured to initiate an update to the ledger 132 via any suitable mechanism, such as the transmission of a transaction to each of the nodes 130. Following the performance of block 620, the ledger 132 is updated to reflect the labeling of the product 112 with the label 800 bearing the unique product identifier mentioned above. Referring again to FIG. 8, the ledger 132 is shown as an updated ledger 132a reflecting the above-mentioned update.

Referring again to FIG. 6, at block 625 the server 136 is configured to determine whether to generate a further transaction for recordation to the ledger 132. The further transaction, also referred to as a register, may be a transaction associated with evaluation conditions such as those specified in a smart contract encoded in the ledger 132. For example, metadata from one or more transactions in the ledger 132 may be compared to the evaluation conditions, and a further transaction such as a payment, an invoice or the like reflecting the delivery of a product from one entity 108 to another may be generated and recorded to the ledger 132. In the present example, the evaluation conditions require the presence of metadata for the product captured at both a first location (e.g. the entity 108-1) and a second location (e.g. the entity 108-2). Since the product 112 has not yet been delivered to the entity 108-2, the determination at block 625 is therefore negative.

Figure 9:
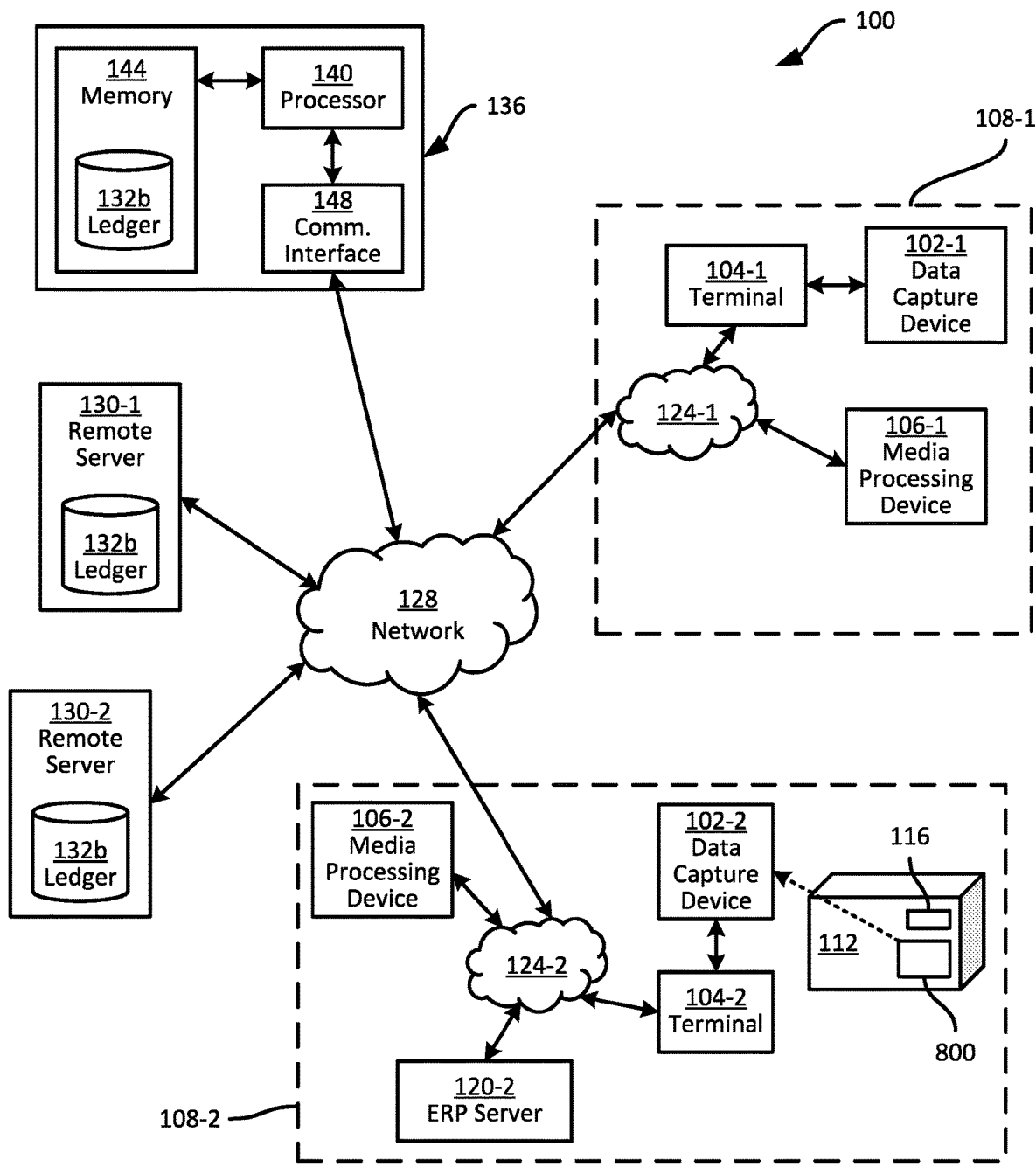
FIG. 9 is a diagram illustrating the system of FIG. 8 following additional performances of the methods of FIGS. 5 and 6.

Referring now to FIG. 9, the product 112 is shown as having been delivered from the entity 108-1 to the entity 108-2. A further performance of the method 500 is executed by the data capture device 102-2 and the terminal 104-2. In particular, having established a connection with the server 136 at block 505, the data capture device 102-2 is configured to capture product data at block 510, in the form of the serialized barcode on the label 800 (which uniquely identifies the product 112). It is assumed that the flag stored by one or more of the driver 224, the driver 240 and the firmware 242 of the data capture device 102-2 and the terminal 104-2 is in the active state, and the determination at block 515 is therefore affirmative. The terminal 104-2 is therefore configured to send the serialized barcode (e.g. along with metadata such as a timestamp and location) to the server 136, and also to provide the serialized barcode to the application 228, e.g. for handling by the local server 120-2.

The server 136 is configured, at a further performance of block 605, to receive the product data (i.e. the serialized barcode mentioned above). The determination at block 610 is negative, and the determination at block 617 is affirmative. At block 620, therefore, the server 136 is configured to record the product data to the ledger 132, which is therefore updated to a ledger 132b as shown in FIG. 9. The ledger 132b thus includes at least a first record indicating the labeling of the product 112 with the serialized barcode at the entity 108-1, and a second record indicating the scanning of the product 112 at the entity 108-2. The server 136 is then configured to determine, at block 625, whether to generate a register. The determination at block 625 can include, for example, the determination of an elapsed time period between the time periods associated with the labeling of the product 112 at the entity 108-1 and the scanning of the product 11 at the entity 108-2. The elapsed time period can be compared with a predefined time period specified in the evaluation conditions encoded in the ledger 132, and a payment amount from the entity 108-2 to the entity 108-1 can be determined at the server 136 based on the comparison. For example, if the elapsed time period is below a predefined threshold, a maximum payment amount may be employed, whereas if the elapsed time period is above the predefined threshold, a reduced payment amount may be generated. The register is then recorded to the ledger 132 to effect the above-noted payment at block 630. Recordation of the register to the ledger 132 can be effected, for example, independently by each node of the ledger 132 (e.g. the server 136 and the nodes 130 illustrated in FIG. 1), as the evaluation conditions are encoded in the ledger 132 itself.

Variations to the above systems and methods are contemplated. For example, in some embodiments, the terminal 104 and corresponding data capture device 102 can be integrated in a single physical device configured to perform the method 500. In other embodiments, the media processing devices 106 can be associated with the terminals 104 (e.g. receiving media processing data and transmitting event completion data through the terminals 104). In still further variations, the terminals 104 and/or the media processing devices 106 can be configured to record data directly to the ledger 132. That is, the terminals 104 and/or the media processing devices 106 themselves can be configured as nodes for the ledger 132.

The system 100 and variations thereto can be employed for a wide variety of recordation functions, in addition to or instead of the supply chain-related example discussed above. For example, the system 100 may be deployed to track safety inspection data, e.g. for a pipeline. In such a deployment, a terminal 104 and corresponding data capture device 102 may be employed by a safety inspector to capture data such as a barcode, RFID payload or the like affixed on or near a segment of the pipeline. Through the performance of the method 500 by the terminal 104 and the data capture device 102, as well as the performance of the method 600 by the server 136, data may be recorded to the ledger 132 confirming that an inspection of the above-noted pipeline segment was performed. The data may include the data captured by the data capture device 102 from the pipeline, as well as metadata such as a timestamp and location (e.g. which may be verified against a known location of the pipeline segment prior to recordation on the ledger 132).

In another example, the system 100 may be deployed to track traffic or other public safety citations (e.g. related to any one or more of parking, driving, jaywalking, littering, open carry, public intoxication, minor drug use and/or sale infractions, and the like). A terminal 104 and corresponding data capture device 102 can be operated (e.g. by a public safety officer) to capture data such as offender identification (e.g. a driver's license). The captured data, along with metadata such as a timestamp and location, operator identifier and indication of the nature of the citation, may be transmitted via the performance of the method 500 for recordation on the ledger 132. In some embodiments, via performance of the methods 600 and 700, the server 136 may return data to the terminal 104 or an associated media processing device 106, such as a unique identifier for printing on a citation receipt for the offender.

Various mechanisms are contemplated for controlling the states of the flags in the repositories 308 and 408 (i.e. for switching the flags in the repositories 308 and 408 between the activated and deactivated states). For example, the states of the flags in the repository 308 and/or 408 of each computing device operated by a given entity may be controlled by the entity controlling the server 136. In various embodiments, the states of the flags in the repository 308 and/or 408 of each computing device operated by a given entity may be controlled by a manufacturer of the terminals 104, developer of the drivers implemented on the terminals, manufacturer of data capture devices 102, manufacturer of media processing devices 106, and/or developer of any firmware implemented on any of the data capture devices 102 and/or media processing devices 106. The server 136 or an associated computing device operated by the above-noted entity may, for example, be configured to transmit control signals to any one or more of the terminals 104, data capture devices 102 and media processing devices 106 to change the state of the flags stored thereon. The signal to set the flags may be transmitted, for example, responsive to the entity 108 controlling the terminals 104, data capture devices 102 and media processing devices 106 obtaining authorized access to the server 136 and/or the ledger 132 (i.e. to the functionality implemented by the server 136 to collect data from the terminals 104, data capture devices 102 and media processing devices 106 and record such data to the ledger 132). In other examples, the flags can be set by a third party (other than the entities 108 and the entity controlling the server 136) responsive to the third party receiving an indication that an entity 108 has been granted the above-mentioned authorized access.

The potential advantages of the above-noted configuration include the added layer of security afforded through a potentially closed channel of communication between the manufacturer/driver and/or firmware developer and the device receiving the flag-setting command. For example, potential advantages of the systems, methods, and devices described herein are that transaction-related data recorded on the distributed ledger can bypass the application layer of the devices (e.g., terminal 104) operated by entities 108, which can reduce instances of spoofing transaction metadata at the application layer and ensure recordation of original transaction data. Additionally, the setting of the flag(s) below the application layer (e.g., at the device firmware and/or driver level) and transmitting the transaction data outside of the application layer (e.g., of the terminal 104) enables the appropriate recordation of the transaction data on the distributed ledger without the need to modify the application layer (e.g., an ERP-related application running on the server 120, a scanning application running on the terminal 104, and/or any application layer program running on data capture device 102 and/or media processing device 106).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system for recording events on a distributed ledger, comprising: a cloud server; a first terminal remote from the cloud server, the first terminal including at least one first terminal processor and an operating system (OS) executing on the at least one first terminal processor; and a data capture device including: a data capture device housing; a data capture assembly positioned at least partially within the data capture device housing, the data capture assembly configured to capture product data associated with products; a data capture device communication interface; a data capture device memory including at least one of a first driver and a data capture device firmware; and at least one data capture device processor configured to execute instructions stored in the data capture device memory, wherein: the data capture device is communicatively coupled to the first terminal via the data capture device communication interface, the instructions stored in the data capture device memory of the data capture device include instructions to transmit the product data through the data capture device communication interface, the first terminal further includes a second driver configured to enable the OS to communicate with the data capture device and to accept the product data transmitted through the data capture device communication interface, at least one of (i) the first driver, (ii) the second driver, and (iii) the data capture device firmware includes a transmission flag alternately changeable between an activated state and a deactivated state, the activated state causing at least some of the product data to be transmitted to the cloud server, an activation of the transmission flag and/or a deactivation of the transmission flag is based on a signal received from the cloud server, and upon at least a portion of the at least some of the product data satisfying a predetermined recordation condition, the at least a portion of the at least some of the product data transmitted to the cloud server is caused to be recorded, from the cloud server, to the distributed ledger; an enterprise resource planning (ERP) server communicatively coupled to the first terminal; and a merchant ERP application executing partially on the ERP server and partially on the first terminal, the merchant ERP application configured to process the product data associated with the products, wherein the activation of the transmission flag and/or the deactivation of the transmission flag is not controlled by the merchant ERP application.

2. The system of claim 1, wherein the product data includes at least one of (i) decoded data associated with a symbology, (ii) payload data associated with a wireless tag, and (iii) event metadata associated with obtaining at least one of the decoded data and the payload data.

3. The system of claim 1, wherein the data capture assembly is at least one of an imaging assembly operable to capture image data, a laser assembly operable to capture symbology data, and a wireless tag reader assembly operable to capture wireless tag payload data.

4. The system of claim 1, further comprising: a media processing device including: a media processing device housing; a media processing assembly positioned at least partially within the media processing device housing, the media processing assembly configured to process media to impart identifying data thereon; a media processing device communication interface; a media processing device memory including at least one of a third driver and a media processing device firmware; and at least one media processing device processor configured to execute instructions stored in the media processing device memory, wherein: the media processing device is communicatively coupled to the cloud server via the media processing device communication interface, responsive to receiving the at least some of the product data at the cloud server, the cloud server generates a media processing signal based at least in part on the at least some of the product data and transmits the media processing signal to the media processing device, and responsive to receiving the media processing signal at the media processing device, the media processing device processes a media in accordance with the media processing signal.

5. The system of claim 4, wherein the at least some of the product data includes a non-unique product-identifier, and wherein the media processing signal includes a unique product-identifier.

6. The system of claim 4, wherein responsive to processing the media in accordance with the media processing signal, the instructions stored in the media processing device memory of the media processing device include instructions to transmit an event completion signal through the media processing device communication interface to the cloud server.

7. The system of claim 4, wherein: at least one of (i) the third driver and (ii) the media processing device firmware includes a second transmission flag alternately changeable between an activated state and a deactivated state, responsive to processing the media in accordance with the media processing signal and further responsive to the second transmission flag being in the activated state, the instructions stored in the media processing device memory of the media processing device include instructions to transmit an event completion signal through the media processing device communication interface to the cloud server to be recorded, from the cloud server, to the distributed ledger.

8. The system of claim 4, wherein processing the media in accordance with the media processing signal includes at least one of (i) printing a symbol and (ii) encoding a payload in a wireless electronic tag.

9. The system of claim 1, further comprising: a merchant ERP application executing at least partially on the first terminal, the merchant ERP application configured to process the product data associated with the products.

10. The system of claim 1, further comprising: a second terminal remote from the cloud server, the second terminal including at least one second terminal processor and an OS executing on the at least one second terminal processor; and a second data capture device including: a second data capture device housing; a second data capture assembly positioned at least partially within the second data capture device housing, the second data capture assembly configured to capture a second product data associated with the products; a second data capture device communication interface; a second data capture device memory including at least one of a fourth driver and a second data capture device firmware; and at least one second data capture device processor configured to execute instructions stored in the second data capture device memory, wherein: the second data capture device is communicatively coupled to the second terminal via the second data capture device communication interface, the instructions stored in the second data capture device memory of the second data capture device include instructions to transmit the second product data through the second data capture device communication interface, the second terminal further includes a fifth driver configured to enable the OS executing on the at least one second terminal processor to communicate with the second data capture device and to accept the second product data transmitted through the second data capture device communication interface, at least one of (i) the fourth driver, (ii) the fifth driver, and (iii) the second data capture device firmware includes a second transmission flag alternately changeable between the activated state and the deactivated state, the activated state causing at least some of the second product data to be transmitted to the cloud server, upon at least a portion of the at least some of the second product data satisfying a second predetermined recordation condition, the at least a portion of the at least some of the second product data transmitted to the cloud server is caused to be recorded, from the cloud server, to the distributed ledger, the cloud server is a multi-merchant server configured to be connected to by multiple merchants, the first terminal is associated with a first merchant, the second terminal is associated with a second merchant, and the first terminal accepts the product data earlier in time than the second terminal accepts the second product data.

11. The system of claim 10, wherein at least one of (i) the at least a portion of the at least some of the product data and (ii) the at least a portion of the at least some of the second product data is augmented with metadata prior to or during recordation to the distributed ledger.

12. The system of claim 11, wherein the metadata is associated with at least one of (i) an expected product dispatch time, (ii) an actual product dispatch time, (iii) an expected product delivery time, (iv) an actual product delivery time, and (v) a geographic location of product at time of product data capture.

13. The system of claim 12, wherein: the distributed ledger includes a plurality of evaluation conditions, a product is transmitted from a first location associated with the first merchant to a second location associated with the second merchant, a first metadata is captured at the first location, a second metadata is captured at the second location, each of the first metadata and the second metadata is evaluated against the plurality of evaluation conditions, and a register is generated based at least in part on results of evaluating the each of the first metadata and the second metadata against the plurality of evaluation conditions.

14. The system of claim 1, wherein the first terminal further includes a product processing application executing above the OS, and wherein the second driver (i) transmits the product data to the OS and (ii) transmits the at least some of the product data to the cloud server.

15. The system of claim 1, wherein the at least a portion of the at least some of the product data is checked against the predetermined recordation condition in at least one of (i) the data capture device, (ii) the second driver, and (iii) the cloud server.

16. The system of claim 1, wherein the signal is received from the cloud server in response to an entity controlling the first terminal or the data capture device obtaining authorized access to the cloud server or the distributed ledger.

17. The system of claim 1, wherein the activation of the transmission flag and/or the deactivation of the transmission flag is not controllable by an application executing on the first terminal or the data capture device.

18. A data processing device operable to transmit data for recordation on a distributed ledger, comprising: a data processing device housing; a data processing assembly positioned at least partially within the data processing device housing, the data processing assembly configured to at least one of (i) capture product data associated with products and (ii) process media to impart identifying data thereon; a data processing device communication interface; a data processing device memory including at least one of a first driver and a data processing device firmware; and at least one data processing device processor configured to execute instructions stored in the data processing device memory, wherein: the instructions stored in the data processing device memory of the data processing device include instructions to transmit an acknowledgement of successfully processing data by the data processing assembly, and at least one of (i) the first driver and (ii) the data processing device firmware includes a recordation flag alternately changeable between an activated state and a deactivated state, the activated state causing acknowledgement data associated with the acknowledgement to be recorded to the distributed ledger, and wherein an activation of the recordation flag is based on a signal received in response to an authorized access of the distributed ledger; an enterprise resource planning (ERP) server communicatively coupled to the first terminal; and a merchant ERP application executing partially on the ERP server and partially on the first terminal, the merchant ERP application configured to process the product data associated with the products, wherein the activation of the transmission flag and/or the deactivation of the transmission flag is not controlled by the merchant ERP application.

* * * * *